G. MACLOSKIE.
FLUID PRESSURE BRAKE.
APPLICATION FILED MAR. 21, 1917.

1,281,801.

Patented Oct. 15, 1918.
2 SHEETS—SHEET 1.

Inventor:
George Macloskie,
by Albert H. Davis
His Attorney.

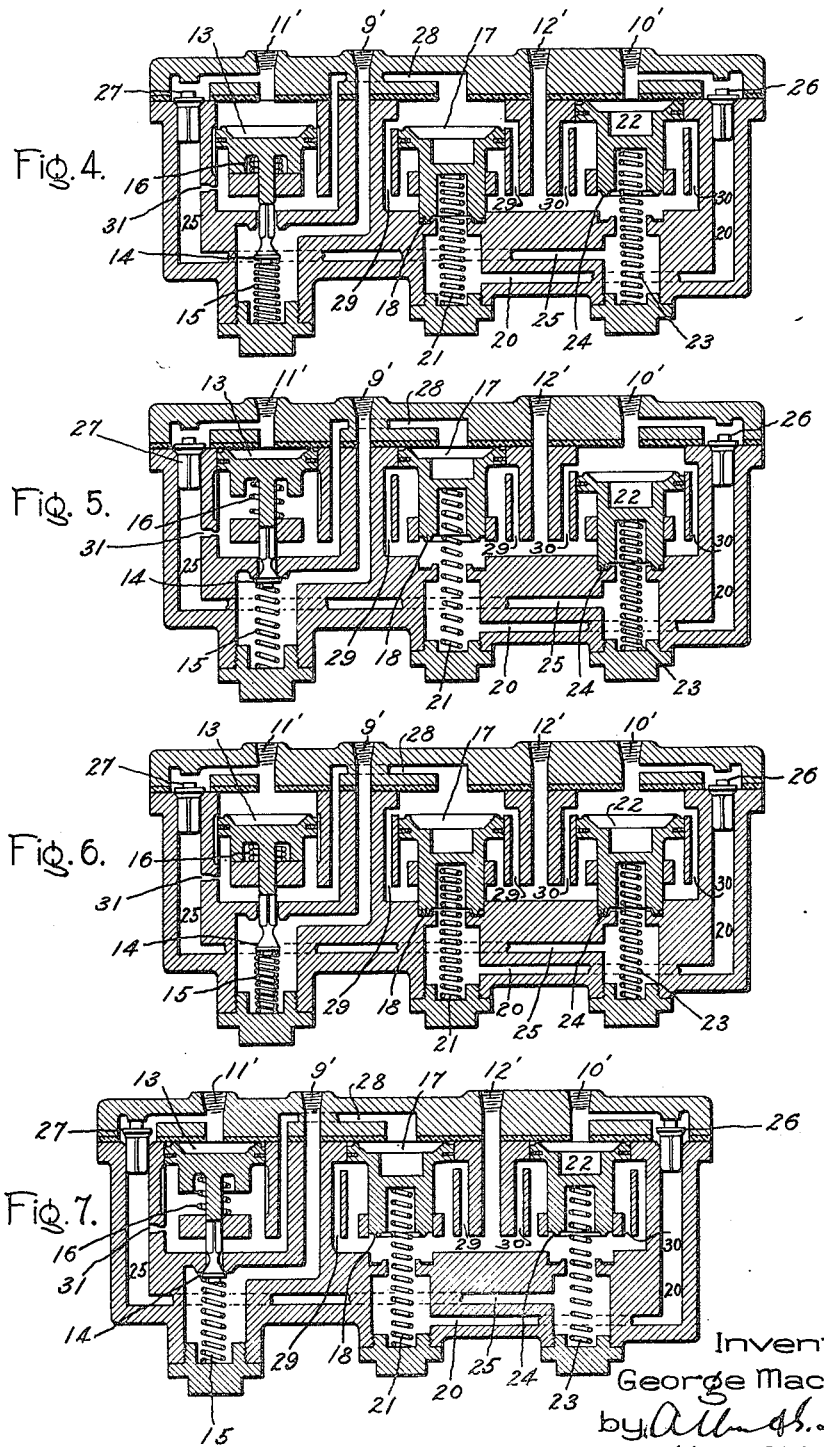

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

FLUID-PRESSURE BRAKE.

1,281,801.   Specification of Letters Patent.   Patented Oct. 15, 1918.

Application filed March 21, 1917.   Serial No. 156,449.

*To all whom it may concern:*

Be it known that I, GEORGE MACLOSKIE, a citizen of the United States, residing at Erie, in the county of Erie, in the State of Pennsylvania, have invented certain new and useful Improvements in Fluid-Pressure Brakes, of which the following is a specification.

My invention relates to fluid pressure brakes for railway cars and it provides improved means whereby the brakes may be applied and released in a safe, reliable, and efficient manner.

More specifically, my invention relates to combined fluid pressure braking apparatus, such as combined straight and automatic air brake apparatus. Such fluid pressure braking apparatus has features of particular advantage in electric traction service where electric cars are operated singly part of the time, and at other times are run in trains of two or more cars, the straight air system being provided for use when the cars are operated singly and the automatic system for use when the cars are being operated in trains.

One of the objects of my invention is to provide improved means for facilitating the release of the brakes in connection with fluid pressure braking systems, particularly combined straight and automatic air brake systems.

Further objects of my invention are to obtain a fine graduation of the braking effect and to quicken the application of fluid pressure brakes by providing an improved straight and automatic air brake apparatus of simple construction in which substantially the full pressure carried by the system is available both in automatic and straight air operation.

My invention comprises, among other important features, an improved quick service valve whereby substantially the full pressure of the system is made available to apply the brakes quickly or slowly as desired, and whereby the exhaustion of the brake cylinders to release the brakes is quickly and effectively accomplished. In the preferred form of my invention a plurality of exhaust passages are provided and the arrangement is such that in releasing the brakes, when the air has been exhausted to a predetermined pressure through one passage, an additional communication with the atmosphere is opened through another exhaust passage.

Other objects and purposes of my invention will appear in the course of the following description of the accompanying drawings, wherein I have shown my invention embodied in concrete form for purposes of illustration.

Figure 1:
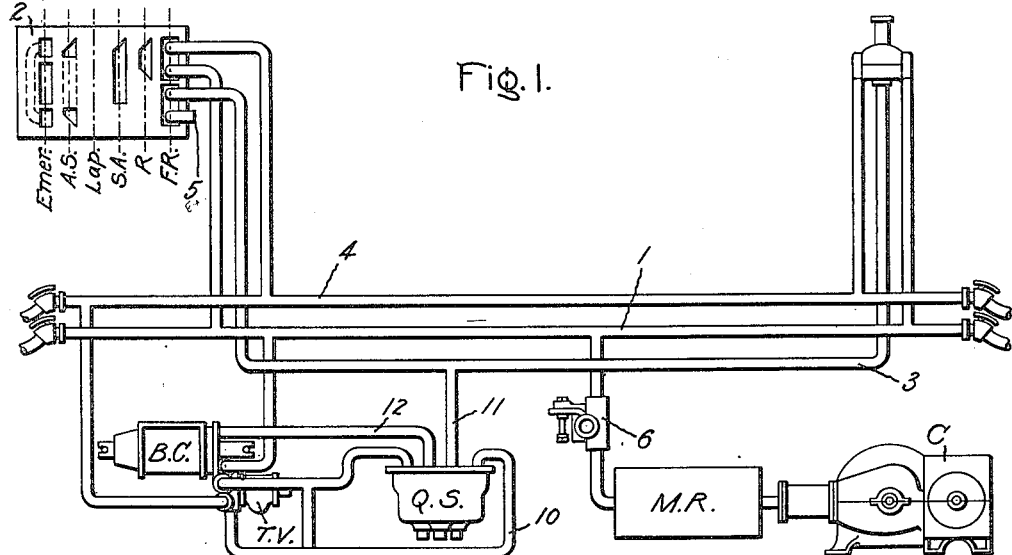
Figure 2:
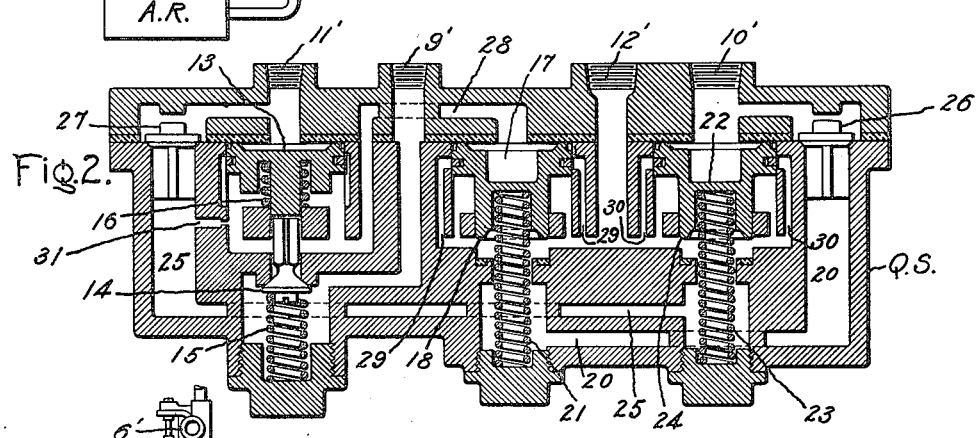
Figure 3:
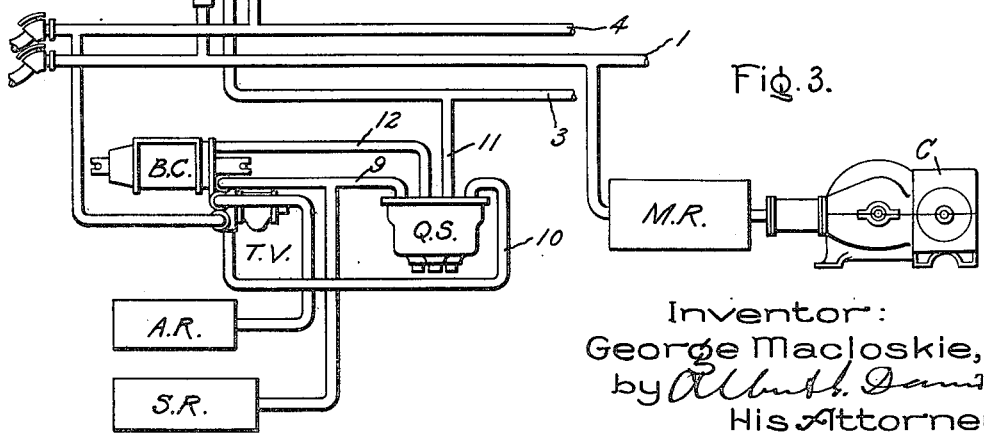

Referring to the drawings, Figure 1 shows diagrammatically a combined straight and automatic air brake apparatus embodying my invention; Fig. 2 is a developed sectional view of my improved quick service valve Q. S., shown diagrammatically as part of the air brake system in Fig. 1; Fig. 3 is a diagrammatic representation of a modification of the combined straight and automatic air brake apparatus shown in Fig. 1, this figure showing my invention embodied in an arrangement wherein there is provided a supplementary reservoir for the air brake system in addition to the auxiliary reservoir which is provided in the arrangement shown in Fig. 1; Fig. 4 is a view similar to Fig. 2 and shows the relative positions which the parts of the quick service valve assume when a straight air application is made; Figs. 5, 6 and 7 are similar views, showing respectively the relative positions of the parts of this valve in an automatic service application, and emergency application, and the final release position of the brakes.

Referring to Fig. 1, the control pipe 1 of the air brake system receives air from the main reservoir M. R., through the feed valve 6. The air in this reservoir is automatically maintained at a predetermined pressure by means of the motor driven compressor C, in a well known manner. The brake valve 2, a developed view of which is shown at the left of this figure, is provided for controlling the braking effect, and has connections leading to the control pipe 1, the straight air pipe 3, the automatic or brake pipe 4, and a pipe or other exhaust connection 5 leading to the atmosphere. The brake valve is shown in the first or full release position, wherein the brake pipe 4 is connected to the control pipe 1 through a port in the brake valve to maintain the air in the brake pipe at the desired pressure as predetermined by the setting of the reducing slide valve 6. The brake valve 2 has six operative positions. Starting from the first or full release position F. R. shown in the drawings, these positions are respectively, the retain position R wherein the brake pipe 4 is connected to the control pipe 1 through a port of restricted area in the brake valve, the straight air pipe 3 and the exhaust pipe 5 being blanked. The third position is the straight air application or service position, wherein the straight air pipe 3 is directly connected to the control pipe 1 through a port in the brake valve of such size as to give a straight air application of the brakes. The train pipe 4 is also connected to the control pipe 1, but through a port of restricted area, and in this position of the valve the exhaust passage 5 is blanked. In the fourth or lap position of the brake valve, all the ports are blanked. In the fifth, the automatic service position A. S., the control pipe 1 and the straight air pipe 3 are blanked and the brake pipe 4 is connected to atmosphere through ports of restricted area in the brake valve. In the sixth or final position, the emergency application of the brakes is made. In this position the control pipe 1 is connected to the straight air pipe 3 through a full sized port in the brake valve and the brake pipe 4 is likewise connected through full sized ports to the exhaust passage 5.

The triple valve T. V. is preferably of the well known variable release type. This valve is connected to auxiliary reservoir A. R. through the pipe connection 9 which also serves to connect the quick service valve Q. S. to the auxiliary reservoir. A pipe 10 connects the brake cylinder port of the triple valve to the quick service valve, and the quick service valve is connected to the straight air pipe 3 and the brake cylinder B. C. through the pipes 11 and 12 respectively.

In Fig. 2 the preferred form of my quick service valve is shown. This valve has a pipe connection 11' to which the straight air pipe 3 is connected, a pipe connection 9' to which the auxiliary reservoir A. R. is connected, a pipe connection 12' to which the brake cylinder pipe 12 is connected and a pipe connection 10' to which the brake cylinder exhaust port of the triple valve T. V. is connected. In the preferred form of my quick service valve, there is provided an application piston 13 the valve stem of which operates the application valve 14. These valves are normally biased to the position shown in the drawing by the spring 15 and the differential spring 16. The application valve 14 is provided for automatically opening the connection from the auxiliary reservoir to supplement the air supplied from the straight air pipe 3 with air taken from the auxiliary reservoir when a straight air application of the brakes is made. The straight air release piston 17 controls the passage leading to the brake cylinder connection 12', and the stem 18 of this valve serves as a valve piston to open and close the passage 20 which serves as an exhaust passage to the triple valve pipe connection. This valve is biased to the position shown in the drawing by means of the spring 21. The automatic release piston 22 is provided for controlling the passage from the triple valve connection 10' to the brake cylinder connection 12' and to the straight air pipe, and is normally biased to the position shown in the drawing by means of the spring 23. The stem 24 of the automatic release piston 22 serves as a valve piston to control the passage 25 which serves as an exhaust passage to the straight air pipe connection. The straight air and automatic check valves 26 and 27 respectively are provided in the passages 20 and 25 respectively for a purpose to be hereinafter more fully described.

Referring to Figs. 1 and 2 and 3 to 7 inclusive, the operation of the arrangement so far described is as follows: With the brake valve in the full release position shown in the drawing and the air pressure in the control pipe 1 at its normal predetermined pressure, the brakes released and the various parts of the quick service valve in the positions shown in Fig. 2, in order to make a straight air application of the brakes, the brake valve 2 is moved to the straight air application position S. A. thus connecting the straight air pipe 3 directly to the control pipe and the brake pipe 4 to the control pipe through a port of restricted area, thereby raising the pressure in the straight air pipe 3 and maintaining the normal pressure in the brake pipe. Admitting pressure to the straight air pipe 3 causes the application piston 13 of the quick service valve to be moved against its bias to the position shown in Fig. 4, at the same time moving the application valve 14 to open the passage from the auxiliary reservoir A. R. through the pipe connection 9'. Air then flows from the straight air pipe around the leakage grooves of the application piston and from the auxiliary reservoir through the application valve to the port 28, the air from the straight air pipe being thus supplemented with air taken from the auxiliary reservoir. The straight air release piston 17 is thereby moved against its bias into the position shown in Fig. 4, uncovering the port 29 leading to the brake cylinder connection 12'. Air is then permitted to flow from the straight air pipe and the auxiliary reservoir to the brake cylinder B. C. to make a straight air application of the brakes. At the same time the stem 18 of the straight air release piston closes the exhaust passage 20.

After the brake valve has been moved to the straight air position and a certain amount of air has been admitted to the brake cylinder as above described, moving the brake valve to the lap position will cause the braking effect to be maintained at that value, disregarding leakage. When the brake valve is moved to the lap position the pressures on both sides of the application piston 13 are equalized and this piston will move upward in accordance with its bias, closing the connection from the brake cylinder to the straight air pipe, at the same time permitting the application valve 14 to close the connection to the auxiliary reservoir. The straight air application piston 17 will not move upward in accordance with its bias although the pressures on both sides of this piston are substantially the same, since the area on the upper side is greater than the area on the lower side, it being understood that this piston has been moved to the lower position at which the stem 18 closes the passage 20.

In order to release the brakes, the brake valve is returned to the full release position F. R. as shown in Fig. 1, thereby connecting the straight air pipe 3 to the exhaust 5 through the brake valve. The application piston 13 and the application valve 14 are thereby automatically, in accordance with their bias, returned to their original positions as shown in Fig. 7 if they have not been already thus operated by moving the brake valve back to the lap position. The connection to the auxiliary reservoir is thus closed and air from the brake cylinder now flows through the brake cylinder connection 12′, beneath the automatic release piston 22 to the exhaust passage 25, raising the straight air check valve 27 and permitting air to flow to atmosphere through the straight air pipe. When the pressure of the air in the brake cylinder has dropped to a predetermined value, as for instance 8 lbs. the spring 21 moves the straight air release piston 17 upward to its normal position as shown in Fig. 7, thereby opening an additional exhaust passage to atmosphere underneath the straight air release piston 17. The exhaust passage 20 is thus opened and the automatic check valve 26 is moved to the position shown in Fig. 7. An additional exhaust passage is thereby opened, this passage being through the triple valve and through its exhaust port to atmosphere. It has heretofore taken a long time to fully exhaust the air from the brake cylinder because of the fact that the exhaustion proceeded very slowly as the pressure of air in the brake cylinder approached atmospheric pressure. For instance, without my improved arrangement it ordinarily requires over twice as long to reduce the brake cylinder pressure from 5 lbs. to atmospheric pressure as to reduce it from a full application pressure of 50 lbs. to 5 lbs. It can readily be seen that by the arrangement which I have provided, an additional passage to atmosphere is opened at the most needed time, thereby insuring a very quick and effective release of the brakes.

In order to make an automatic service application of the brakes, the brake valve 2 is moved to the 5th position A. S., where the brake pipe 4 is connected through ports of restricted area to the exhaust 5. This causes a reduction of the pressure in the brake pipe, and causes the triple valve T. V. to make an application of the brakes in a well known manner. Pressure is thereby admitted through the triple valve to the top of the automatic release piston 22, moving this piston against its bias to the position shown in Fig. 5. Air is thereby admitted to the brake cylinder connection 12′ and thus to the brake cylinder through the ports 30 which have been uncovered by the automatic release piston. The valve stem 24 of the automatic release piston, at the same time closes the connection to the exhaust passage 25.

After an automatic service application of the brakes has been made in the manner above described, by moving the brake valve to the lap position, the triple valve is caused to move to its lap position and the automatic release piston 22 is thereby maintained in its lower position against its bias. The brakes are thereby maintained with the braking effect as determined by the pressure of air which has been admitted to the brake cylinder, disregarding the ordinary leakage.

In order to release the brakes, the brake valve 2 is moved to the full release position shown in Fig. 1, thereby connecting the brake pipe 4 to the control pipe 1, raising the pressure in the brake pipe and causing the triple valve T. V. to open a connection to atmosphere. Air is now permitted to flow from the brake cylinder through the port 30 above the automatic release piston 22 through the triple valve connection 10′ and through the triple valve to atmosphere, thereby releasing the brakes. Air is also permitted to flow through the exhaust passage 20, raising the automatic check valve 26 and opening an additional exhaust passage to the triple valve connection 10′. When the pressure in the brake cylinder has been reduced to a predetermined value, as for instance 8 lbs., the automatic release piston 22 is moved to its upper position in accordance with its bias, thereby admitting air to the exhaust passage 25, raising the straight air check valve 27 and opening an additional passage to atmosphere through the straight air pipe 3. It can thus be seen that in releasing the brakes after an automatic service application has been made and the pressure in the brake cylinder has dropped to a predetermined value, opening this additional passage to atmosphere through the straight air pipe effects a prompt and positive release of the brakes. During final release, the position of the parts of the quick service valve are shown in Fig. 7. It will be understood that the check valves 26 and 27 will close as soon as the brake cylinder has been substantially exhausted.

In order to make an emergency application of the brakes, the brake valve 2 is moved to the 6th or emergency position, shown in Fig. 1. The air pressure in the straight air pipe 3 is thereby very quickly raised, the pressure in the train pipe 4 is simultaneously very quickly reduced, and the parts of the quick service valve assume the positions shown in Fig. 6. Air is thus admitted to the brake cylinder through the straight air pipe connection 11', around the leakage grooves of the application piston 13, and from the auxiliary reservoir through the application valve 14. At the same time, air is admitted to the brake cylinder through the triple valve to the connection 10' thence through the port 30 which has been uncovered by the downward movement of the automatic release piston 22. The passages to the exhaust passages 20 and 25 are likewise closed. Air is thereby admitted to the brake cylinder in the quickest manner possible in this system and at the greatest pressure desirable for use in applying the brakes.

In order to insure that full control pipe pressure will not be admitted to the brake cylinder and thus make a release of the brakes through the operation of the brake valve impossible, I have provided the differential spring 16 to move the application piston 13 to its upper or closed position and thus permit the application valve 14 to close responsively to the action of the spring 15. The differential spring 16 will normally be set to move the application piston to the closed position when the pressure in the brake cylinder is approximately 5 to 7 lbs. less than the control pipe pressure, assuming that the normal pressure of the control pipe is approximately 70 lbs. After an emergency application, the release of the brake cylinder pressure is begun through the triple valve and if this differential spring were not provided to prevent the brake cylinder pressure being increased to practically the same as that of the control pipe, the triple valve could not operate to open its exhaust passage since there would be substantially the same pressure on both sides of the piston of the triple valve. The various parts of the quick service valve assume the positions shown in Fig. 6 in an emergency application, but it is to be understood that when the brake cylinder pressure is increased to approximately 5 to 7 lbs. less than the control pipe pressure, the application piston 13 will be moved by the differential spring 16 to the upper closed position and the application valve 14 will likewise be moved to the closed position by the spring 15. However if the brake cylin-der pressure has not been increased to the pressure at which the differential spring 16 will operate as soon as the brake valve is moved to release position, both the application piston and the application valve will be moved to their closed positions. The release after emergency application is as follows: The parts of the quick service valve being in the positions shown in Fig. 6, moving the brake valve 2 to the full release position connects the straight air pipe to atmosphere and raises the pressure in the train pipe. This causes the application piston 13 and the application valve 14 to immediately move to the up position in accordance with their bias and the application valve 14 closes the connection from the auxiliary reservoir. Increasing the pressure in the train pipe causes the piston of the triple valve to move to the release position, opening the connection to atmosphere and thereby connecting the brake cylinder to atmosphere through the port 30, over the automatic release piston 22 through the triple valve pipe connection 10', pipe 10, and the triple valve to atmosphere. As soon as the brake cylinder pressure has been reduced to the predetermined value of 8 lbs. as in the example heretofore given, the automatic release piston 22 and the straight air release piston 17 will be moved upward in accordance with their bias, closing the connection to atmosphere through the port 30 and opening the connection to atmosphere through the exhaust passages 20 and 25, as heretofore explained.

The function of the port 31 in the quick service valve will now be described. In case an automatic service application of the brakes has been made and the automatic release piston 22 of the quick service valve is moved to the position shown in Fig. 5 if the motorman's valve 2 be moved to the release position and held there a short interval, sufficiently long to open the connection to atmosphere through the triple valve, and before the brakes had been released the brake valve is moved to the straight air application position, the application piston 13 would be moved downward, the connection from the auxiliary reservoir would be opened, and the straight air release piston would be moved downward. This would connect the straight air pipe and the auxiliary reservoir directly to atmosphere and the air pressure in the entire system would thereby be exhausted. In order to provide against this, the small port 31 is drilled in the side of the application piston chamber.

After an automatic service application of the brakes has been made, moving the brake valve to the full release position will cause the brake cylinder to be connected to atmosphere through the triple valve as heretofore explained. If the brake valve is left in this release position a short time, but not sufficiently long to exhaust the air from the brake cylinder, and the brake valve is then moved to the straight air position, the application piston 13 will be moved downward and air will flow through the small port 31 to the port 25 to the under side of the valve piston 24 formed on the lower part of the valve stem of the automatic release piston 22. This pressure, assisted by the pressure of the spring 23, will cause the automatic release piston 22 to be moved upward to its closed position, thereby closing the exhaust passage through the triple valve and permitting a straight air application of the brakes, at the same time avoiding having the air pressure in the entire system exhausted, as heretofore explained.

In Fig. 3 I have shown my improved quick service valve applied to a combined air brake system which is substantially similar to that shown in Fig. 1 with the exception that a supplementary reservoir S. R. is provided and the reducing slide valve 6' is connected between the control pipe and the brake valve instead of between the main reservoir and the control pipe as in Fig. 1. The supplemental reservoir S. R. may be for the well known purpose of securing graduated release of the brakes during the operation of the automatic side of the combined system, or at least may be charged in substantially the same manner as a supplemental reservoir provided for such a purpose. In a straight air application of the brakes, air is taken from this supplementary reservoir to supplement the air admitted from the straight air pipe 3 instead of being taken from the auxiliary reservoir as in the arrangement shown in Fig. 1. The operation of this arrangement shown in Fig. 3 will readily be understood from a consideration of the operation of the arrangement shown in Fig. 1 and need not be further described.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. In a fluid pressure brake, the combination with a brake cylinder, means for supplying fluid thereto, and means providing a plurality of exhaust passages from said brake cylinder, of a valve closing one of said passages upon the supply of fluid to said brake cylinder and opening said passage upon the decrease of the pressure in said brake cylinder to a predetermined value.

2. In a fluid pressure brake, the combination with a brake cylinder and means for supplying fluid thereto, said means including a passage for the release of fluid from said brake cylinder, of a valve operated upon fluid being supplied to said brake cylinder to close a second release passage, and means for moving said valve to open said second release passage upon the decrease of the pressure in the brake cylinder to a predetermined value.

3. In an air brake, the combination with a straight air pipe and a brake cylinder, of valve mechanism operated responsively to the pressure in the straight air pipe to admit air to the brake cylinder to apply the brakes and to release the brakes by exhausting air from the brake cylinder through a plurality of passages leading to exhaust through the said valve mechanism.

4. In combined air brake apparatus, the combination with a brake pipe, triple valve and brake cylinder, of valve mechanism operated responsively to brake pipe pressure to admit air to the brake cylinder to apply the brakes and to release the brakes by exhausting air from the brake cylinder through a plurality of passages leading to exhaust through the said valve mechanism, one of which passages is controlled in response to a decrease of the pressure in the brake cylinder.

5. In an air brake, the combination with a straight air pipe and brake cylinder, of valve mechanism operated responsively to the pressure in the straight air pipe to admit air to the brake cylinder to apply the brakes and to release the brakes by exhausting the air from the brake cylinder through the straight air pipe and another passage leading to atmosphere.

6. In combined air brake apparatus, the combination with a straight air pipe, triple valve and brake cylinder, of valve mechanism operated responsively to the pressure in the straight air pipe to admit air to the brake cylinder to apply the brakes and to release the brakes by exhausting the air from the brake cylinder through the triple valve and another passage leading to atmosphere.

7. In an air brake, the combination with a brake pipe, triple valve and brake cylinder, of valve mechanism operated responsively to the pressure in the brake pipe to admit air to the brake cylinder to apply the brakes and to release the brakes by exhausting the air from the brake cylinder through the triple valve and another passage leading to atmosphere.

8. In combined air brake apparatus, the combination with a brake pipe, straight air pipe, triple valve and brake cylinder, of valve mechanism operated responsively to the pressure in the brake pipe to admit air to the brake cylinder to apply the brakes and to release the brakes by exhausting the air from the brake cylinder through the straight air pipe and another passage leading to atmosphere.

9. In combined air brake apparatus, the combination with a brake pipe, straight air pipe, triple valve and brake cylinder, of valve mechanism operated responsively to the pressure in the straight air pipe to admit air to the brake cylinder to apply the brakes and to release the brakes by exhausting the air from the brake cylinder through the straight air pipe until the pressure has dropped to a predetermined value and then opening an additional passage leading to atmosphere.

10. In combined air brake apparatus, the combination with a brake pipe, straight air pipe, triple valve and brake cylinder, of valve mechanism operated responsively to the pressure in the brake pipe to admit air to the brake cylinder to apply the brakes and to release the brakes by exhausting the air from the brake cylinder through the triple valve until the pressure has dropped to a predetermined value and then opening an additional passage to atmosphere.

11. In combined air brake apparatus, the combination with a brake pipe, straight air pipe, triple valve and brake cylinder, of valve mechanism operated responsively to the pressure in the brake pipe to admit air to the brake cylinder to apply the brakes, and means whereby the brakes are released by exhausting the air from the brake cylinder through the triple valve until the pressure has dropped to a predetermined value and then opening an additional passage to atmosphere through the straight air pipe.

12. In combined air brake apparatus, the combination with a straight air pipe, triple valve and brake cylinder, of valve mechanism operated responsively to the pressure in the straight air pipe to admit air to the brake cylinder to apply the brakes and to release the brakes by exhausting the air from the brake cylinder through independent passages connected to the triple valve and the straight air pipe respectively.

13. In combined air brake apparatus, the combination with a brake pipe, straight air pipe, triple valve, and brake cylinder, of valve mechanism operated responsively to the pressure in the brake pipe to admit air to the brake cylinder to apply the brakes and to release the brakes by exhausting the air from the brake cylinder through the triple valve and the straight air pipe.

14. In a combined air brake apparatus, the combination with a brake pipe, straight air pipe, triple valve and brake cylinder, of valve mechanism operated responsively to the pressure in the straight air pipe to admit air to the brake cylinder to apply the brakes, and means whereby the brakes are released by exhausting the air from the brake cylinder through the straight air pipe until the pressure has dropped to a predetermined value and then opening a connection to exhaust through the triple valve.

15. In a combined air brake apparatus, the combination with a straight air pipe, brake pipe, triple valve and brake cylinder, of valve mechanism operated responsively to the pressure in the brake pipe to admit air to the brake cylinder to apply the brakes and to release the brakes by exhausting the air through the triple valve until the brake cylinder pressure has dropped to a predetermined value and then opening an additional passage to exhaust through the straight air pipe.

16. In a combined air brake apparatus, the combination with a brake pipe, straight air pipe, triple valve and brake cylinder, of valve mechanism comprising a straight air release piston operated responsively to an increase of pressure in the straight air pipe to admit air to the brake cylinder and to close a connection to exhaust through the triple valve, the said automatic release piston operating to open the connection to exhaust through the triple valve in releasing the brakes when the brake cylinder pressure has been reduced to a predetermined value.

17. In combined air brake apparatus, the combination with a brake pipe, straight air pipe, and brake cylinder, of valve mechanism operated responsively to an increase of air pressure in the straight air pipe and a reduction of pressure in the brake pipe to make an emergency application of the brakes, and means whereby the connection to the brake cylinder from the straight air pipe is automatically closed when the pressure in the brake cylinder has reached a predetermined value less than the normal brake pipe pressure.

18. In combined air brake apparatus, the combination with a brake pipe, straight air pipe, auxiliary reservoir, triple valve and brake cylinder, of valve mechanism operated responsively to an increase of air pressure in the straight air pipe and a reduction of pressure to the brake pipe to make an emergency application of the brakes by admitting air to the brake cylinder from the straight air pipe, the auxiliary reservoir and through the triple valve, and means whereby the connections from the straight air pipe and from the auxiliary reservoir are automatically closed when the pressure in the brake cylinder has reached a predetermined value less than the normal brake pipe pressure.

19. In combined air brake apparatus, the combination with a brake pipe, straight air pipe, triple valve and brake cylinder, of valve mechanism operated responsively to the pressure in the straight air pipe and the pressure in the train pipe to admit air to the brake cylinder from the straight air pipe and through the triple valve to make an emergency application of the brakes, and to release the brakes by exhausting air through the triple valve and another passage leading to atmosphere.

20. In combined air brake apparatus, the combination with a brake pipe, straight air pipe, triple valve and brake cylinder, of valve mechanism operated responsively to the pressure in the straight air pipe and the pressure in the brake pipe to admit air to the brake cylinder from the straight air pipe and through the triple valve to make an emergency application of the brakes, and to release the brakes by exhausting air from the brake cylinder through the straight air pipe and another passage leading to atmosphere.

21. In combined air brake apparatus, the combination with a brake pipe, straight air pipe, triple valve and brake cylinder, of valve mechanism operated responsively to the pressure in the straight air pipe and the pressure in the brake pipe to admit air to the brake cylinder from the straight air pipe and through the triple valve to make an emergency application of the brakes, and to release the brakes by exhausting air through the triple valve and through the straight air pipe.

22. In combined air brake apparatus, the combination with a brake pipe, straight air pipe, triple valve and brake cylinder, of valve mechanism operated responsively to the pressure in the straight air pipe and the pressure in the brake pipe to admit air to the brake cylinder from the straight air pipe and through the triple valve to make an emergency application of the brakes and to release the brakes by exhausting air through the triple valve until the brake cylinder pressure has dropped to a predetermined value and then opening an additional passage to atmosphere.

23. In combined air brake apparatus, the combination with a brake pipe, straight air pipe, auxiliary reservoir, triple valve and brake cylinder, of valve mechanism operated responsively to the pressure in the brake pipe and the pressure in the straight air pipe to admit air to the brake cylinder from the straight air pipe, the auxiliary reservoir, and through the triple valve to make an emergency application of the brakes, and to release the brakes by exhausting air through the triple valve until the brake cylinder pressure has dropped to a predetermined value and then opening an additional passage to atmosphere through the straight air pipe.

24. In combined air brake apparatus, the combination with a brake pipe, straight air pipe, triple valve and brake cylinder, of valve mechanism comprising a straight air release piston biased to a predetermined position, the said piston adapted to move against its bias responsively to the substantial variation in the pressure of the air in the straight air pipe to admit air to the brake cylinder and simultaneously close a passage between the brake cylinder and the triple valve, the said valve mechanism operating to release the brakes by exhausting air from the brake cylinder through the straight air pipe until the brake cylinder pressure has dropped to a value at which the said release piston is moved in accordance with its bias to open an additional exhaust connection through the said passage between the brake cylinder and the triple valve.

25. In combined air brake apparatus, the combination with a brake pipe, straight air pipe, triple valve and brake cylinder, of valve mechanism comprising an automatic release piston biased to a predetermined position, the said piston adapted to move against its bias responsively to a substantial variation in the brake pipe pressure to admit air to the brake cylinder and simultaneously close a passage between the brake cylinder and the straight air pipe, the said valve mechanism operating to release the brakes by exhausting air from the brake cylinder through the triple valve until the brake cylinder pressure has dropped to a value at which the said release piston is moved in accordance with its bias to open an additional exhaust connection through the said passage between the brake cylinder and straight air pipe.

26. In combined air brake apparatus, the combination with a brake pipe, straight air pipe, triple valve and brake cylinder, of valve mechanism comprising a straight air release piston and an automatic release piston, the said pistons being biased to predetermined positions, the said straight air release piston adapted to move against its bias responsively to a substantial variation in pressure in the straight air pipe to admit air to the brake cylinder and simultaneously close a passage between the brake cylinder and the triple valve, the said automatic release piston adapted to move against its bias responsively to a substantial variation in the brake pipe pressure to admit air to the brake cylinder and simultaneously close a passage between the brake cylinder and the straight air pipe, the said valve mechanism operating to release the brakes after an emergency application by exhausting air from the brake cylinder through the triple valve until the brake cylinder pressure has dropped to a value at which the said automatic release piston is moved in accordance with its bias to open an additional exhaust connection through the said passage between the brake cylinder and the straight air pipe.

27. The combination in a quick service valve for combined air brake systems, the said valve having straight air, brake cylinder and triple valve pipe connections, of a straight air release piston biased to close a passage between the straight air and the brake cylinder pipe connections and open a passage between the brake cylinder and the triple valve pipe connections, and an automatic release piston biased to close a passage between the triple valve and the brake cylinder pipe connections and open a passage between the brake cylinder and the straight air pipe connections, each of the said pistons adapted to move against its bias to open its respective passage to brake cylinder and close the other passage which it controls to apply the brakes and to move in accordance with its bias to release the brakes.

28. The combination in a quick service valve for combined air brake systems, the said valve having straight air, brake cylinder, triple valve and auxiliary reservoir pipe connections, of an application piston and an application valve controlled thereby, a straight air release piston biased to close a passage between the chamber for the application piston and the brake cylinder pipe connection and open a passage between the brake cylinder and the triple valve pipe connections, and an automatic release piston biased to close a passage between the triple valve and the brake cylinder pipe connections and open a passage between the brake cylinder and the straight air pipe connections, the straight air release piston and the automatic release piston each adapted to move against its bias to permit air to flow to the brake cylinder to apply the brakes and to move in accordance with its bias to release the brakes.

29. In a fluid pressure brake apparatus, the combination with two separately operable means for supplying fluid under pressure to the brake cylinder and releasing the fluid therefrom, of a valve mechanism controlling the passage of fluid between said brake cylinder and said means, said valve mechanism comprising two release pistons respectively operable on the supply of fluid to said brake cylinder from one of said means to close a release passage from said brake cylinder through the other of said means, said valve mechanism being provided with a passage between one of said fluid supply means and the release piston of the other supply means to assure the return of said release piston to its release position.

In witness whereof, I have hereunto set my hand this 15th day of March, 1917.

GEORGE MACLOSKIE.